Patented Aug. 13, 1946

2,405,873

UNITED STATES PATENT OFFICE 2,405,873

PROCESS FOR THE PREPARATION OF ALPHA-HYDROXY CARBOXYLIC ACIDS

Joseph Blumenfeld, New York, N. Y.

No Drawing. Application October 17, 1942,
Serial No. 462,415

8 Claims. (Cl. 260—521)

The present invention consists in a novel process for the production of esters of methacrylic acid (particularly low-alkyl esters thereof), by a method and from a starting material not heretofore used for the purpose, namely, methyl-butinol, which can be manufactured from acetone and acetylene. These two simple and common products, therefore, can constitute the basic material for the process here described. The process of the present invention can be briefly summarized in the following scheme:

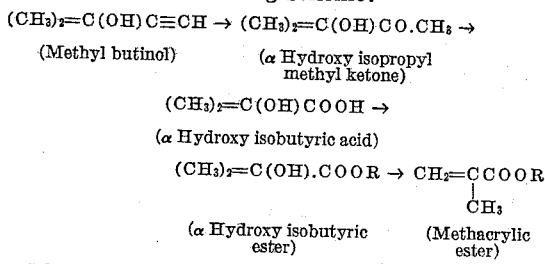

The triple bond in methyl butinol is hydrated under the catalytic influence of an acid mercuric sulphate solution and the hydrated product, α hydroxy isopropyl methyl ketone, is treated with a sodium or calcium hypochlorite solution. It is thus split into chloroform and α hydroxy isobutyric acid which is most conveniently isolated in form of its zinc salt. This acid from this salt is directly esterified, preferably with a lower aliphatic alcohol. The ester formed is dehydrated, e. g., by means of phosphorus pentoxide under the conditions specified in the example. Under these conditions 80% of the expected quantity based on the hydroxy isobutyric acid, is obtained in the form of the pure monomeric methacrylic ester.

It is clear that any methacrylic ester can be obtained by this method, as zinc α hydroxy isobutyrate can be esterified with any desired alcohol.

The following example is given, in which the production of methyl methacrylate is described. This example is, however, no limitation to the methyl ester only. It is also possible to vary the specific methods described, without changing the underlying principles of the process. The details given hereafter are, therefore, only one form in which the process can be carried into effect, a form however which has been found most suitable, of those thus far tried out.

Example

Step 1.—(Making α hydroxy isopropyl methyl ketone.) A solution of 36 parts mercuric oxide in 150 parts sulphuric acid (of 98% strength), diluted with 2,250 parts water, is placed in a steam distillation apparatus and while steam is passing through, 4,330 parts methyl butinol are introduced at a speed of 150 parts per hour. The steam supply is regulated so that 900 parts distillate are collected per hour without substantial change in the liquid level in the apparatus. The aqueous distillate is saturated at 40–50° C., with 11,500 parts sodium carbonate (or at room temperature with the equivalent amount of potassium carbonate). The reaction product, which separates (5,000 parts), is subjected to azeotropic distillation with 2,000 parts benzene and then said ketone is recovered from the anhydrous benzene solution by fractional distillation. Boiling point 45–48°/30 mm., yield 2,800 parts. 1,145 parts methyl butinol are recovered (B. P. 100–103°/760 mm.) and can be recycled. The yield is, therefore, 73%. The catalytic activity of the mercuric salt is exhausted after the above procedure, but the salt can be regenerated by customary methods, for reuse.

Step 2.—(Making zinc α hydroxy isobutyrate.) A reaction flask is mounted with an efficient stirrer, a thermometer, a froth breaking device and a column leading to a condenser and an ice-cooled receiver. To 153 parts of the α hydroxy isopropyl methyl ketone, made as above described, 3,175 parts of a calcium hypochlorite solution (10% active chlorine) are added, while stirring. The temperature rises spontaneously to 56–60° C., and chloroform begins to distil over. One heats within 40–50 minutes to 95–97° C. (internal temperature), filters the solution obtained and adds 145 parts of zinc nitrate or (150 parts of zinc chloride) in concentrated aqueous solution. The zinc salt of α hydroxy isobutyric acid is precipitated as di-hydrate, and this is dried at 130° C.; (its purity was 93–95%, the contamination being zinc oxide). This is sufficiently pure for the next step of the process. Yield 68.5% of the theory (chloroform yield 69%).

Step 3.—(Making methyl α hydroxy isobutyrate.) In the esterification, one has to determine (by calcination) the zinc oxide equivalent of the zinc salt batch to be used and to adjust the quantity of the acid to be added, accordingly. To a stirred suspension of 2,000 parts zinc salt (93% purity) in 2,500 parts carbon tetrachloride, a solution of 920 parts 93% sulphuric acid in 570 parts methyl alcohol is added. This is heated for six hours under reflux and the water is removed by azeotropic distillation (which water contains a small quantity of methyl alcohol), the carbon tetrachloride returning from the column into the reaction vessel. Only after this operation, one filters and washes the solid phase with carbon tetrachloride. The solvent is distilled off under ordinary pressure, and the desired ester is distilled in vacuo (absolute pressure 40 mm.) at 58–55° C. Yield, 1,130 parts. The residue is α hydroxy isobutyric acid which is retransformed into the zinc salt (120 parts). Yield of ester, 75%.

Step 4.—(Making methyl methacrylate). 693 parts methyl α hydroxy isobutyrate and 7 parts hydroquinone are cooled to 0° C., and while stirring, 336 parts phosphorus pentoxide are added. The temperature rises to 15–20° C.; one stirs while refrigerating until the temperature has again fallen to 0° C. The mass is now heated for 3–4 hours at 70–80° C., whereby the phosphorus pentoxide disappears, and a viscous oil is formed, which is now heated in a distillation column, while stirring, to 145° C., internal temperature (170° C., bath temperature). The desired ester (the monomeric methyl methacrylate) begins to distil; when the speed of distillation decreases, one heats further to 200° C., bath temperature (internal temperature 175–180°). Thus, within 3 hours, 522 parts distillate are collected, which are dried over potassium carbonate and distilled in the presence of 2 parts hydroquinone under 115 mm. absolute pressure. 470 g. distil at 48–50° C.; yield, 80% of the monomeric ester. 30 g. polymer remain in the distillation flask, and can be worked up in any suitable manner.

Instead of methyl-butinol, homologues or analogues containing an aryl group, e. g., ethyl-(3)-butine-(1)-ol-(3) or phenyl-(3)-butine-(1)-ol (3) can be used as starting materials. In this case, other α-alkyl- or aryl- substituted acrylic esters are obtained in equally good yields.

Throughout this application, "parts" are given by weight, and all temperatures are expressed in degrees centigrade.

I claim:

1. In the art of chemical synthesis, the herein described step which comprises subjecting α hydroxy isopropyl methyl ketone to treatment with a solution of a hypochlorite, to oxidize same to hydroxy isobutyric acid.

2. A process of making a hydroxy-aliphatic acid which comprises subjecting a ketone having the structural formula

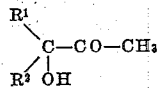

to the oxidizing action of a hypochlorite to form chloroform and an acid having the structural formula

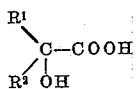

in both of which formulas R¹ is an alkyl radical and R² is a radical selected from the class consisting of alkyl and single ring aryl.

3. In the art of chemical synthesis, the herein described step which comprises subjecting a ketone having the structural formula

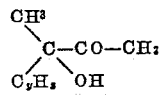

to treatment with a solution of a hypochlorite to oxidize the same to a hydroxy organic acid in which the number of carbon atoms is one less than the number of carbon atoms in the said ketone, in which formula C_yH_z is a monovalent hydrocarbon radical, selected from the group consisting of alkyl and single ring aryl.

4. A process of making a hydroxy-aliphatic acid which comprises subjecting an iso alcohol containing at least 5 carbon atoms and which alcohol includes two alkyl groups attached to the tertiary carbon atom, and which alcohol includes an acetylenic linkage, to a hydration operation whereby an alkyl ketone compound of an iso alcohol is formed, subjecting such ketone compound to oxidation with a hypochlorite to form a hydroxy-aliphatic acid.

5. A process of making a hydroxy-aliphatic acid which comprises subjecting a substance having the structural formula

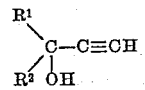

in which R¹ is an alkyl radical and R² is a radical selected from the class consisting of alkyl and single ring aryl, to a hydration operation to produce a substance having the formula

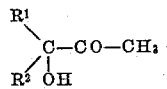

subjecting such latter compound to oxidation with a hypochlorite to form a hydroxy-acid.

6. In the art of chemical synthesis, the herein described step which comprises subjecting a ketone having the structural formula

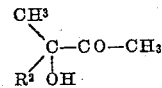

to treatment with a solution of a hypochlorite to oxidize the same to a hydroxy organic acid in which the number of carbon atoms is one less than the number of carbon atoms in said ketone, in which formula R² is an alkyl group.

7. In the art of chemical synthesis, the herein described step which comprises subjecting 3-methyl-3-hydroxy-2-pentanone to treatment with a solution of a hypochlorite, to oxidize same to alpha-hydroxy-methyl-ethyl-acetic acid.

8. In the art of chemical synthesis, the herein described step which comprises subjecting 3-phenyl-3-hydroxy-2-butanone to treatment with a solution of a hypochlorite, to oxidize same to alpha-hydroxy-methyl-phenyl-acetic acid.

JOSEPH BLUMENFELD.